3,553,327
3,6-DIAMINO THIOXANTHENE-10,10-DIOXIDE IN
THE TREATMENT OF EPILEPSY
William Veldkamp, Kalamazoo, Mich., assignor to The
Upjohn Company, Kalamazoo, Mich., a corporation of
Delaware
No Drawing. Filed Nov. 1, 1968, Ser. No. 772,801
Int. Cl. A61k 27/00
U.S. Cl. 424—275                                  2 Claims

ABSTRACT OF THE DISCLOSURE 3,6-diaminothioxanthene-10,10-dioxide or pharmacologically acceptable acid addition salts thereof prepared in unit dosage form with pharmaceutical carriers for oral and parenteral administration to humans and animals. Process for treating convulsive seizure or migraine and process for inducing sedation or tranquilization by administering the composition at a dose of from 25 to 1000 mg. per dosage unit or from 0.5 mg. to 20 mg./kg. of body weight of subject.

BRIEF SUMMARY OF THE INVENTION

This invention relates to pharmaceutical compositions in unit dosage form comprising 3,6-diaminothioxanthene-10,10-dioxide of the formula

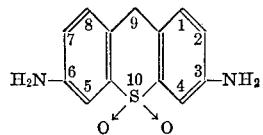

or pharmacologically acceptable acid addition salts thereof in association with a pharmaceutical carrier. Another aspect of the invention is a process for inhibiting convulsive seizures, inducing sedation and tranquilization, and treating migraine.

DETAILED DESCRIPTION 3,6-diaminothioxanthene-10,10-dioxide free bass can be prepared by the method disclosed by Stein, Chem. Ber. 27, 2806 (1894).

Pharmacologically acceptable acid addition salts both mono- and di-salts can be prepared by reaction of 3,6-diaminothioxanthene-10,10-dioxide free base with the appropriate amount of an inorganic or organic acid, examples of which are hydrochloric, hydrobromic, sulfuric, nitric, phosphoric, acetic, lactic, benzoic, salicylic, glycolic, succinic, tartaric, maleic, malic, pamoic, cyclohexanesulfamic, citric and methanesulfonic acids, and like pharmacologically acceptable acids. The reaction can be carried out by a variety of procedures known to the art to be generally useful for the preparation of amine acid addition salts. The choice of the most suitable procedure will depend on a variety of factors including convenience of operation, economic considerations, and particularly the solubility characteristics of 3,6-diaminothioxanthene-10,10-dioxide free base, the acid, and the acid addition salts. If the acid is soluble in water, the 3,6-diaminothioxanthene-10,10-dioxide free base can be dissolved in water containing a stoichiometric amount of the acid, and thereafter, the water can be removed by evaporation; in some instances the salt precipitates from the aqueous solution, particularly when cooled, and evaporation is not necessary. If the acid is soluble in a relatively non-polar solvent, for example, diethyl ether or diisopropyl ether, separate solutions of the acid and 3,6-diaminothioxanthene-10,10-dioxide free base in such a solvent can be mixed in stoichiometric amounts, whereupon the acid addition salt will usually precipitate because of its relatively low solubility in the non-polar solvent. Alternatively, the 3,6-diaminothioxanthene-10,10-dioxide free base can be mixed with a stoichiometric amount of the acid in the presence of a solvent of moderate polarity for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt.

The administration of the compositions of the present invention provides a method for inhibiting convulsive seizures, both in frequency and severity. The convulsive seizures can be of various types, e.g., major motor seizures (grand mal or focal) Petit mal, psychomotor seizures, and minor motor seizures (alkinetic or myoclonic), as well as induced seizures such as are due to electroshock, insulin, and thiosemicarbazide. Further, the administration provides a method of inducing CNS sedation and tranquilization and a treatment for migraine.

The amount of 3,6-diaminothioxanthene-10,10-dioxide or salts thereof to be administered varies with the weight, age, condition, route of administration, and species of animal. In general a dose of from 0.5 mg. to 20 mg./kg. of subject body weight per dose; preferably 2 mg. to 10 mg./kg. is used. Conveniently the compositions are prepared in dosage units of from 25 to 1000 mg.

3,6-diaminothioxanthene-10,10-dioxide or salts thereof is presented for oral administration in solid and liquid unit dosage forms, such as tablets, capsules, powders, granules, syrups, elixirs, and the like, containing suitable quantities of 3,6-diaminothioxanthene-10,10-dioxide.

Powders are quite simply prepared by comminuting 3,6-diamonothioxanthene-10,10-dioxide to a suitably fine size and mixing with a similarly comminuted diluent. The diluent can be an edible carbohydrate material such as starch or lactose. Advantageously, a sweetening agent or sugar is present as well as a flavoring. Dry granulations for reconstitution with water are prepared utilizing water-soluble diluents. A powder mixture of finely divided 3,6-diaminothioxanthene-10,10-dioxide and a water-soluble diluent such as sucrose, glucose, and the like, is wetted with a binder such as acacia mucilage or gelatin solution and forced through a screen to form granules which are allowed to dry. Advantageously, a thickening or suspending agent such as methylcellulose is present as well as a wetting agent and flavoring.

Capsules are produced by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating by slugging, adding a lubricant and pressing into tablets. The powder mixture is prepared by mixing 3,6-diaminothioxanthene-10,10-dioxide suitably comminuted, with a diluent or base such as starch, lactose, kaolin, dicalcium phosphate and the like. The powder mixture can be granulated by wetting with a binder such as corn syrup, gelatin solution, methylcellulose solution or acacia mucilage and forcing through a screen. An alternative granulating procedure is by slugging the powder mixture, i.e., run the powder mixture through a tablet machine and the resulting large tablets broken into pieces (slugs). The slugs can be lubricated to prevent sticking to the tablet-forming dies by means of the addition of stearic acid, a stearate salt, talc or mineral oil. The lubricated mixture is then compressed into tablets of the required weight.

Advantageously, the tablet can be provided with a protective coating consisting of a sealing coat of shellac, a coating of sugar and methylcellulose and a polish coating of carnauba wax.

Oral fluids are prepared in unit dosage forms such as syrups and elixirs wherein each teaspoonful of composition contains a predetermined amount of 3,6-diaminothioxanthene-10,10-dioxide for administration.

A syrup is prepared by a water soluble 3,6-diaminothioxanthene-10,10-dioxide salt in a suitably flavored aqueous sucrose solution. Similarly an elixir is prepared utilizing a hydroalcoholic vehicle. Elixirs are advantageous vehicles for use when another therapeutic agent which is not sufficiently water soluble is to be included in the composition.

For parenteral administration aqueous fluid unit dosage forms can be prepared. In preparing the parenteral form, a measured amount of a water soluble salt of 3,6-diaminothioxanthene-10,10-dioxide and a pharmacologically acceptable acid is placed in a vial, the vial and its contents sterilized and sealed. An accompanying vial of sterile water is provided as a vehicle to form a solution prior to administration. Advantageously, the sterile water can have dissolved therein a local anesthetic and buffering agents.

Alternatively, a parenteral suspension can be prepared by suspending sterile 3,6-diaminothioxanthene-10,10-dioxide in a sterile aqueous vehicle or in a parenterally acceptable vegetable oil with or without additional adjuvants.

In addition to oral and parenteral administration, the rectal route can be utilized. 3,6-diaminothioxanthene-10,10-dioxide can be administered by means of a suppository. A vehicle which has a melting point at about body temperature or one that is readily soluble can be utilized. For example, cocoa butter and various solid polyethylene glycols can serve as the vehicle.

For the treatment of domestic birds and animals by oral administration, the 3,6-diaminothioxanthene-10,10-dioxide is conveniently prepared in the form of a food premix. The food premix can comprise the active material in admixture with an edible diluent such as starch, oatmeal, flour, calcium carbonate, talc, dried fish meal and the like nontoxic, orally acceptable edible diluents. The prepared premix is then conveniently added to the regular feed, thereby providing medication to the animal or bird in the course of feeding.

In addition to the administration of 3,6-diaminothioxanthene-10,10-dioxide or salts thereof as the principal active ingredient of compositions for the treatment of the conditions described herein, the said compound can be included with other types of compounds to obtain advantageous combinations of properties. Such combinations can include 3,6-diaminothioxanthene-10,10-dioxide in combination with other anticonvulsant agents such as mephentoin, ethotoin, primidone, phensuximide, paramethadione, diphenylhydantoin or trimethadione, barbituates such as phenobarbital, mephobarbital and metharbital, muscle relaxants such as meprobamate and chlorphenesin carbamate, antianxiety agents such as chlordiazepoxide, diazepam and oxazepam, and stimulants such as desoxyephedrine and amphetamine.

The following examples illustrate the best mode contemplated by the inventor for carrying out the invention but are not to be construed as limiting the scope thereof.

EXAMPLE 1

One thousand tablets for oral use, each containing 100 mg. of 3,6-diaminothioxanthene-10,10-dioxide, are prepared from the following ingredients:

|  | Gm. |
|---|---|
| 3,6-diaminothioxanthene-10,10-dioxide | 100 |
| Dicalcium phosphate | 200 |
| Methylcellulose, U.S.P. (15 c.p.s.) | 6.5 |
| Talc | 30 |
| Calcium stearate | 3.5 |

The 3,6-diaminothioxanthene-10,10-dioxide and dicalcium phosphate are mixed well, granulated with 7.5% w./v. aqueous solution of methylcellulose, passed through No. 8 screen and dried carefully. The dried granules are passed through a No. 12 screen, mixed with the talc and stearate and compressed into tablets.

The foregoing tablets are useful in the treatment of epilepsy in humans at a dosage of 5 tablets per day.

EXAMPLE 2

One thousand two-piece hard gelatin capsules for oral use, each capsule containing 60 mg. of 3,6-diaminothioxanthene-10,10-dioxide dihydrochloride and 15 mg. of phenobarbital, are prepared from the following ingredients:

|  | Gm. |
|---|---|
| 3,6 - diaminothioxanthene-10,10-dioxide dihydrochloride | 60 |
| Phenobarbital | 15 |
| Corn starch | 120 |
| Talc | 60 |
| Magnesium stearate | 25 |

The finely powdered materials are mixed thoroughly, then filled into hard gelatin capsules of appropriate size.

The foregoing capsules are useful in treatment of major motor seizures due to epilepsy, at a dosage of 1 capsule four times a day.

EXAMPLE 3

An aqueous oral preparation containing in each 5 ml. 50 mg. of 3,6-diaminothioxanthene-10,10-dioxide dihydrochloride, is prepared from the following ingredients:

| 3,6-diaminothioxanthene - 10,10 - dioxide dihydrochloride | gm | 100 |
|---|---|---|
| Methylparaben | gm | 7.5 |
| Propylparaben | gm | 2.5 |
| Saccharin sodium | gm | 12.5 |
| Cyclamate sodium | gm | 2.5 |
| Glycerin | ml | 3,000 |
| Tragacanth powder | gm | 100 |
| Orange oil flavor | gm | 10 |
| F. D. and C. Orange dye | gm | 7.5 |
| Deionized water q.s. | ml | 10,000 |

The foregoing composition is useful in the control of epileptic seizures in children at a dosage of 1 teaspoonful every six hours.

EXAMPLE 4

A sterile aqueous suspension for intramuscular injection, containing in each ml. 100 mg. of 3,6-diaminothioxanthene-10,10-dioxide, is prepared from the following ingredients:

| 3,6 - diaminothioxanthene-10,10-dioxide | gm | 100 |
|---|---|---|
| Sodium carboxymethylcellulose, low viscosity | gm | 10 |
| Polysorbate 80, U.S.P. | gm | 4 |
| Propylparaben, U.S.P. | gm | 0.4 |
| Water for injection q.s. | ml | 1,000 |

The foregoing parenteral suspension is useful in the treatment of convulsive epileptic seizures at a dosage of 1 ml. twice a day.

EXAMPLE 5

One thousand tablets are prepared from the following types and amounts of ingredients.

|  | Gm. |
|---|---|
| 3,6-diaminothioxanthene-10,10-dioxide | 350 |
| Citric acid, powder | 50 |
| Talc | 50 |
| Magnesium stearate | 2.5 |

The ingredients are mixed together and slugged. The slugs are screened and pressed into tablets.

EXAMPLE 6

One thousand hard gelatin capsules are prepared from the following types and amounts of ingredients:

| | Gm. |
|---|---|
| 3,6-diaminothioxanthene-10,10-dioxide | 250 |
| Ascorbic acid | 15 |
| Starch | 25 |
| Terra alba | 75 |
| Magnesium stearate | 3.5 |

The ingredients are powdered and mixed together until uniformly dispersed and filled into hard gelatin capsules.

EXAMPLE 7

One thousand tablets for oral administration, each containing 25 mg. of 3,6-diaminothioxanthene-10,10-dioxide and 16.2 mg. of phenobarbital are prepared from the following types and amounts of ingredients:

| | Gm. |
|---|---|
| 3,6-diaminothioxanthene-10,10-dioxide | 25 |
| Phenobarbital | 16.2 |
| Lactose | 175 |
| Starch | 15 |
| Magnesium stearate | 1.5 |

The ingredients are thoroughly mixed and slugged. The slugs are broken down by forcing through a screen and the resulting granules are then compressed into tablets.

The preceding tablets are useful for the prevention of convulsive seizures in dogs at a dose of 1 tablet twice a day.

EXAMPLE 8

One thousand ml. of a syrup is prepared from the following types and amounts of ingredients:

| | |
|---|---|
| 3,6-diaminothioxanthene-10,10-dioxide dihydrochloride | gm 50 |
| Cocoa syrup U.S.P., q.s. | ml 1000 |

The 3,6 - diaminothioxanthene-10,10-dioxide dihydrochloride is stirred with cocoa syrup until dissolved.

EXAMPLE 9

One thousand ml. of an elixir, containing 100 mg. of 3,6-diaminothioxanthene-10,10-dioxide sulfate and 8.1 mg. of phenobarbital in each 5 ml., is prepared from the following types and amounts of ingredients:

| | |
|---|---|
| 3,6-diaminothioxanthene-10,10-dioxide sulfate | gm 20 |
| Phenobarbital | gm 1.62 |
| Citric acid | gm 0.1 |
| F.D.C. Red No. 1 | gm 0.04 |
| Saccharin | gm 0.1 |
| Sucrose | gm 200 |
| Oil of spearmint | gm 0.1 |
| Oil of wintergreen | gm 0.1 |
| Polysorbate 80 U.S.P. | gm 1 |
| Ethanol 95% | ml 200 |
| Glycerin | ml 150 |
| Water q.s. | ml 1000 |

The sugar is dissolved in 450 ml. of water and the citric acid, color, and the 3,6-diaminothioxanthene-10,10-dioxide sulfate added thereto. The phenobarbital and saccharin are added to the mixture of alcohol and glycerin and stirred until dissolved. The flavors are mixed with the polysorbate 80 and added to the alcohol-glycerin solution followed by the addition of the sugar solution and sufficient water to make 1000 ml.

EXAMPLE 10

A sterile aqueous solution for parenteral administration, containing 50 mg. of 3,6-diaminothioxanthene-10,10-dioxide dihydrochloride in each ml., is prepared from the following types and amounts of ingredients:

| | |
|---|---|
| 3,6-diaminothioxanthene-10,10-dioxide dihydrochloride | gm 50 |
| Chlorobutanol, anhydrous | gm 5 |
| Water for injection q.s. | ml 1000 |

The 3,6 - diaminothioxanthene-10,10-dioxide dihydrochloride and chlorobutanol are dissolved in the water for injection and the solution sterilized by filtration. The sterile solution is filled into 2 ml. sterile vials and sealed.

I claim:

1. A process for inhibiting convulsive seizures due to epilepsy comprising the administration of 3,6-diaminothioxanthene-10,10-dioxide or a pharmacologically acceptable acid addition salt thereof to a subject predisposed to epileptic convulsive seizures wherein from about 0.5 mg. to about 20 mg. per kilogram body weight of said subject is administered.

2. A process of claim 1 wherein from about 25 to about 1000 mg. of 3,6-diaminothioxanthene-10,10-dioxide or salt thereof is administered.

References Cited

Chem. Abst., vol. 64, p. 3397S, Subject Index P–Z (1966).

STANLEY J. FRIEDMAN, Primary Examiner